(No Model.)

A. R. FORNEY & J. L. STOEVER.
CHAIN PUMP BUCKET.

No. 280,597. Patented July 3, 1883.

Witnesses.
Edwin L. Jewell.
J. J. McCarthy.

Inventors
Adam R. Forney and
Jeremiah L. Stoever.
C. M. Alexander.
Attorney.

UNITED STATES PATENT OFFICE.

ADAM R. FORNEY AND JEREMIAH L. STOEVER, OF ANNVILLE, PA.

CHAIN-PUMP BUCKET.

SPECIFICATION forming part of Letters Patent No. 280,597, dated July 3, 1883.

Application filed March 29, 1883. (No model.)

*To all whom it may concern:*

Be it known that we, ADAM R. FORNEY and JEREMIAH L. STOEVER, citizens of the United States, residing at Annville, in the county of Lebanon and State of Pennsylvania, have invented certain new and useful Improvements in Chain-Pump Buckets, of which the following is a specification, reference being had therein to the accompanying drawings.

This invention relates to certain improvements in expansion-buckets for chain-pumps; and it has for its objects to provide an improved link and means for conveniently and positively securing the link thereon, to provide for expanding the rubber as required, and to furnish means for the escape of water from above the bucket to prevent freezing, and the consequent injury to the pump and inconvenience in cold weather, as more fully hereinafter specified. These objects we attain by the means illustrated in the accompanying drawings, in which—

Figure 1:
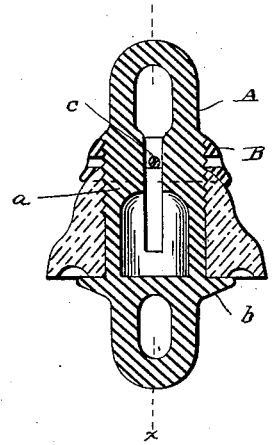
Figure 2:
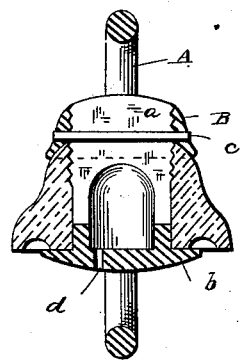

Figure 1 represents a vertical sectional view of our improved pump-bucket, and Fig. 2 a similar view on the line $x\ x$ of Fig. 1.

In the said drawings, the letter A indicates the link which carries the rubber packing-ring forming the bucket of a chain-pump. The said link is formed with a cylindrical enlargement, $a$, which has a flange, $b$, at its lower end, forming a seat for the said ring. The upper portion of said extension is screw-threaded externally for the reception of an annular internally-threaded screw-cap, B, by which the packing-ring is confined to its seat. The said enlarged portion of the link is slotted from the upper end to near the bottom for the passage of a pin, $c$, which is passed through diametrically-opposite holes in the cap. The object of the pin is to hold the cap and prevent it from turning when properly adjusted. The enlarged portion of the link is made hollow to save material, and through the bottom, communicating with the interior of the said portion, is an aperture or small opening, $d$, through which the water may escape from above the bucket when the pump is at rest, in order to prevent freezing in cold weather.

The operation of our invention will be readily understood from the above description, and is as follows: The rubber-packing ring is slipped over the upper end of the link and forced down upon the enlarged portion onto the flange which forms its seat. The annular cap is then applied and screwed down upon the upper edge of the rubber packing until it has expanded it to the desired extent, when the pin is inserted through the apertures in the cap and the slot in the link, holding the parts securely in their adjusted position.

Having thus described our invention, what we claim, and desire to secure by Letters Patent, is—

1. A link for chain-pump buckets, having an enlarged screw-threaded and slotted portion, a flange forming a seat for the packing, a screw-threaded annulus for expanding and holding the packing, and a pin for holding the parts, substantially as specified.

2. A link for chain-pump buckets, having a hollow enlarged portion screw-threaded externally for the reception of a cap, and having a seat for the packing at the lower edge, the said portion being slotted at its upper end, and provided with a cylindrical recess, and an aperture at its bottom for the escape of water, substantially as specified.

In testimony whereof we affix our signatures in presence of two witnesses.

ADAM R. FORNEY.
JEREMIAH L. STOEVER.

Witnesses:
ISAAC BEAVER,
J. H. ULRICH.